Patented Jan. 15, 1952

2,582,255

UNITED STATES PATENT OFFICE 2,582,255

ESTERS OF ALPHA-PIPERIDINO ALIPHATIC ACIDS AND THEIR PRODUCTION

Eldon M. Jones, Grosse Pointe Woods, Mich., assignor to Parke, Davis & Company, Detroit, Mich., a corporation of Michigan No Drawing. Application September 15, 1950, Serial No. 185,163

10 Claims. (Cl. 260—294.3)

This invention relates to esters of basically substituted aliphatic acids, their acid addition salts, and to methods for obtaining the same. More particularly, the invention relates to the group of α-piperidino-substituted aliphatic esters having, in the free base form, the formula,

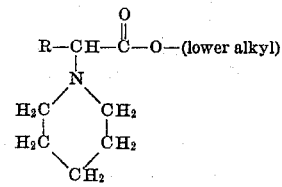

where R is a straight chain alkyl radical containing five to eight carbon atoms inclusive.

In accordance with the invention, α-piperidino-substituted aliphatic esters having the above formula are produced by reacting piperidine with a lower alkyl ester of an α-halogenated aliphatic acid of formula,

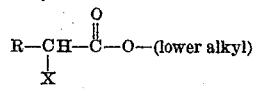

where R has the same significance as given above and X is a halogen atom. In carrying out the reaction it is preferable to employ at least two moles of piperidine or one mole of piperidine with at least one mole of a strongly basic substance such as an alkali metal carbonate or bicarbonate, an alkaline earth metal carbonate or bicarbonate, a tertiary organic amine, and the like. The temperature of reaction is not particularly critical and can vary from about 10° to 100° C. The reaction can be carried out in the presence or absence of an inert organic solvent such as a lower aliphatic alcohol, ether, ester, ketone, glycol, hydrocarbon, halogenated hydrocarbon and the like.

The lower alkyl esters of α-halogenated aliphatic acids used as starting materials need not be in pure form. For example, the crude esters obtained by the reaction of a lower aliphatic alcohol with an α-halogenated aliphatic acyl halide of the formula,

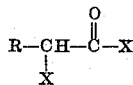

where R and X have the significance given above, can be used without further purification. In carrying out the esterification reaction the α-halogenated aliphatic acyl halide is added slowly to an excess of the alcohol to be esterified, either in the presence or absence of an inert organic diluent such as ether, dioxane, petroleum ether, benzene, toluene, and the like. After this addition is complete and the spontaneous reaction has subsided, the reaction may be completed by the external application of heat but in most instances this will be unnecessary. It is equally satisfactory to reverse the order given above for the mixing of the reactants; i. e., an excess of the alcohol to be esterified can be added to the α-halogenated aliphatic acyl halide, either in the presence or absence of an inert organic diluent, as above.

The α-piperidino-substituted aliphatic acid esters of the invention are basic in nature and form acid addition salts with organic and inorganic acids such as hydrochloric, hydrobromic, hydriodic, sulfuric, phosphoric, sulfamic, tartaric, oxalic, benzoic, citric, picric, acetic, maleic and the like acids. The free bases, as well as the non-toxic acid addition salts, are of particular value in the alleviation of pain. Their analgetic activity is of a high degree, exceeding even that of morphine. They may be administered either orally or parenterally.

The invention is illustrated by the following examples:

Example 1

A mixture of 17 g. of piperidine, 23.7 g. of ethyl α-bromoheptanoate, and 125 ml. of absolute ethanol is allowed to stand, with intermittent shaking, for four days at room temperature. The ethanol is removed by distillation, and 125 ml. of water is added to the residue. The solution is extracted with ether and the ether extract washed first with water, then with excess 20% aqueous hydrochloric acid. The aqueous acid extract is made basic with ammonia and the solution extracted with ether. The ether extract is washed with water, dried over anhydrous potassium carbonate, and the ether removed by distillation. Vacuum distillation of the residue gives ethyl α-piperidinoheptanoate, B. P. 134–6° C. at 8 mm., which has the formula

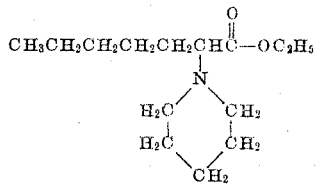

A dry petroleum ether solution of ethyl α-piperidinoheptanoate is treated with an excess of gaseous hydrogen chloride. The white hydrochloride salt of ethyl α-piperidinoheptanoate which separates is collected and purified by recrystallization from a mixture of ethyl acetate and petroleum ether; M. P. 11–12° C.

Example 2

A mixture of 50.2 g. of ethyl α-bromoctanoate, 34 g. of piperidine and 259 ml. of absolute ethanol is evaporated on a steam bath. The residue is extracted with ether and the extract washed first with water, then with an excess of 20% aqueous hydrochloric acid. The aqueous acid extract is made basic with aqueous ammonia and the solution extracted with ether. The ether extract is dried over anhydrous potassium carbonate and the ether removed by distillation. The desired ethyl α-piperidinooctanoate, B. P. 145–50° C. at 8 mm., which has the formula,

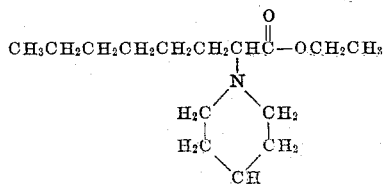

is obtained by vacuum distillation of the residue.

A dry ether solution of 20 g. of the ethyl α-piperidinooctanoate is treated with an excess of gaseous hydrogen chloride. The initially liquid hydrochloride salt of ethyl α-piperidinooctanoate which separates is purified by crystallization from diisopropyl ether; M. P. 106–8° C.

Example 3

24.1 g. of α-bromooctanoyl chloride is treated dropwise with 10 ml. of n-propanol, and the resulting solution stirred for thirty minutes. After the addition of 10 g. of anhydrous sodium carbonate, the solution is then treated with 10 ml. of piperidine. After stirring for one hour, the solution is diluted with ether, filtered, and the filtrate then extracted with excess 20% aqueous hydrochloric acid. The aqueous acid extract is then made basic with aqueous ammonia and the solution extracted with ether. The ether extract is washed with water, dried over anhydrous potassium carbonate, and the ether is removed by distillation. Pure n-propyl α-piperidinooctanoate, B. P. 153–58° C. at 7.5 mm., is obtained by vacuum distillation of the remaining oil. Its formula is,

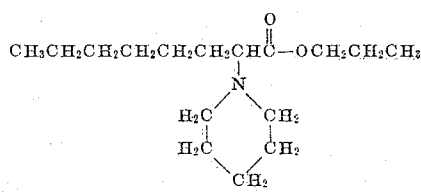

The n-propyl-α-piperidinooctanoate prepared above is dissolved in dry ether and the solution treated with an excess of gaseous hydrogen chloride. The white hydrochloride salt of n-propyl α-piperidinooctanoate which separates is collected and purified by recrystallization from a mixture of ethyl acetate and petroleum ether; M. P. 124–5° C.

Example 4

24.1 g. of α-bromooctanoyl chloride is treated dropwise with 10 ml. of isopropanol, and the resulting solution is stirred for thirty minutes. After the addition of 10 g. of anhydrous sodium carbonate, the solution is then treated with 10 ml. of piperidine. After stirring for one hour, the solution is diluted with ether, filtered, and the filtrate extracted with 20% aqueous hydrochloric acid. The acidic extract is made basic with aqueous ammonia, and the solution is extracted with ether. The ether extract is washed with water, dried over anhydrous potassium carbonate, and the ether removed by distillation. Pure isopropyl α-piperidinooctanoate, B. P. 146–56° C. at 7.5 mm., is obtained by vacuum distillation of the remaining oil. The formula of this compound is,

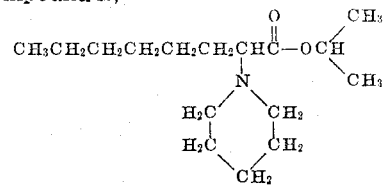

The isopropyl α-piperidinooctanoate prepared above is dissolved in dry ether and the solution treated with an excess of gaseous hydrogen chloride. The white hydrochloride salt of isopropyl α-piperidinooctanoate which separates is collected and purified by recrystallization from a mixture of ethyl acetate and petroleum ether; M. P. 104–6° C.

Example 5

A mixture of 53 g. of ethyl α-bromononanoate, 34 g. of piperidine, and 250 ml. of absolute ethanol is heated on the steam bath until the ethanol has evaporated. The residue is extracted with ether and the resultant extract washed, first with water, then with an excess of 20% aqueous hydrochloric acid. The resulting acid extract is made basic with aqueous ammonia and the alkaline solution extracted with ether. The ether extract is dried over anhydrous potassium carbonate and then the ether is removed by distillation. The desired ethyl α-piperidinononanoate, B. P. 140–53° C. at 8 mm., which has the formula,

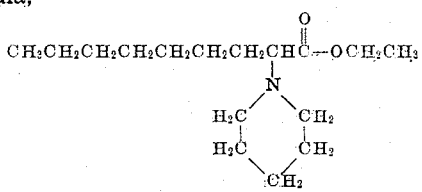

is obtained by vacuum distillation of the residue.

A dry ether solution of 10 g. of ethyl α-piperidinononanoate is treated with an excess of gaseous hydrogen chloride. The white hydrochloride salt of ethyl α-piperidinononanoate which separates is purified by recrystallization from a mixture of diisopropyl ether and ethyl ether; M. P. 108–10° C.

Example 6

A mixture of 55.8 g. of ethyl α-bromodecanoate, 34 g. of piperidine, and 250 ml. of absolute ethanol is allowed to stand at room temperature for three to four days. The alcohol is removed from the solution by distillation and replaced with ether. The resulting ether solution is washed twice with water and then extracted with excess 20% aqueous hydrochloric acid. The aqueous acid extract is made basic with aqueous ammonia and subsequently extracted with ether. After drying the ether extract over anhydrous potassium carbonate, the ether is removed by distillation. Vacuum distillation of the residue yields pure ethyl α-piperidinodecanoate, B. P. 171–81° C. at 7 mm., which has the formula,

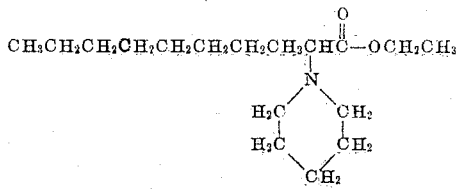

A dry petroleum ether solution of 10 g. of ethyl

α-piperidinodecanoate is treated with excess gaseous hydrogen chloride. The white hydrochloride salt of ethyl α-piperidinodecanoate which separates is collected and purified by recrystallization from a mixture of ethyl acetate and ligroin; M. P. 97-9° C.

*Example 7*

28.8 g. of α-bromoheptanoyl bromide is added dropwise with stirring to 100 ml. of absolute methanol. The reaction mixture is stirred for one-half hour and diluted with 100 ml. of absolute methanol. 5.3 g. of anhydrous sodium carbonate is added followed by 17 g. of piperidine. The solution is stirred at room temperature for one hour, diluted with ether, and filtered.

The filtrate is freed of ether and methanol by distillation and the residue remaining is redissolved in ether. The ether solution is extracted with 20% aqueous hydrochloric acid and the aqueous acid extract made basic with aqueous ammonia. The aqueous alkaline solution is extracted with ether and the ether extract dried over anhydrous potassium carbonate. The ether is removed by distillation and the residue distilled under reduced pressure to obtain the desired methyl α-piperidinoheptanoate of formula,

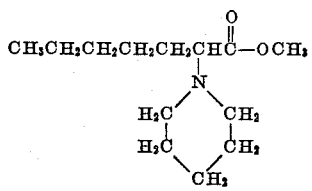

in pure form.

A dry petroleum ether solution of 10 g. of methyl α-piperidinoheptanoate is treated with excess gaseous hydrogen bromide. The white hydrobromide salt of methyl α-piperidinoheptanoate which separates is collected and purified by recrystallization from ethyl acetate.

*Example 8*

A mixture consisting of 30.7 g. of n-butyl α-bromodecanoate, 17.0 g. of piperidine and 150 ml. of absolute ethanol is stirred and refluxed for twenty hours. The ethanol is then removed by distillation and replaced with 500 ml. of ether. The solution is filtered and the ethanol filtrate washed with water. The ether solution is extracted with 20% aqueous hydrochloric acid and the aqueous acid extract made basic with aqueous ammonia. The alkaline solution is extracted with ether and the ether extract dried over anhydrous potassium carbonate. The ether is removed by distillation and the residue distilled in vacuo to obtain the desired n-butyl α-piperidinodecanoate of formula,

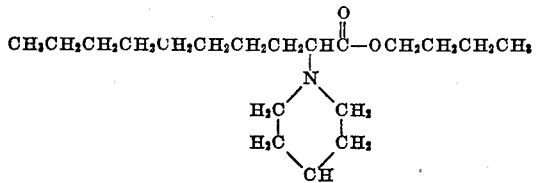

in pure form.

6.03 g. of n-butyl α-piperidinodecanoate and 1.94 g. of sulfamic acid are dissolved in 100 ml. of water and the mixture evaporated to dryness in vacuo. The residue of n-butyl α-piperidinodecanoate sulfamate is recrystallized from methanol.

What I claim is:

1. A compound of the class consisting of a free base and its acid addition salts, said free base having the formula,

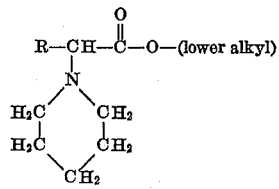

where R is a straight chain alkyl radical containing five to eight carbon atoms inclusive.

2. An acid addition salt of a compound of the formula,

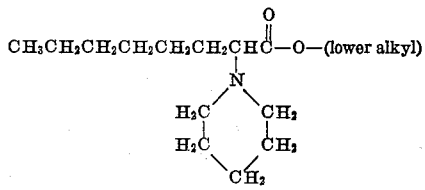

3. The hydrochloride salt of ethyl α-piperidinooctanoate.
4. The hydrochloride salt of n-propyl α-piperidinooctanoate.
5. The hydrochloride salt of isopropyl α-piperidinooctanoate.
6. An acid addition salt of a compound of the formula,

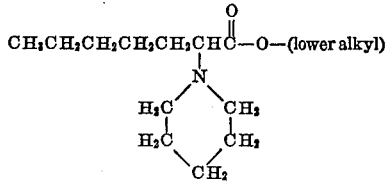

7. The hydrochloride salt of ethyl α-piperidinoheptanoate.
8. An acid addition salt of a compound of the formula,

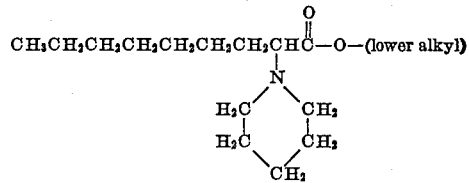

9. The hydrochloride salt of ethyl α-piperidinononanoate.
10. Process for obtaining a compound of the formula,

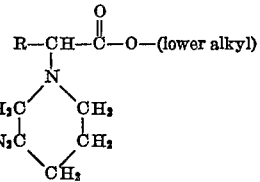

which comprises reacting piperidine with a compound of the formula,

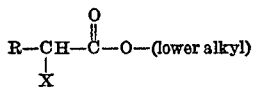

where R is a straight chain alkyl radical containing five to eight carbon atoms inclusive and X is a halogen atom.

ELDON M. JONES.

No references cited.